United States Patent

[11] 3,559,775

| [72] | Inventor | Edwin J. Miller |
| --- | --- | --- |
|  |  | Mount Clemens, Mich. |
| [21] | Appl. No. | 717,669 |
| [22] | Filed | Apr. 1, 1968 |
| [45] | Patented | Feb. 2, 1971 |
| [73] | Assignee | General Motors Corporation |
|  |  | Detroit, Mich. |
|  |  | a corporation of Delaware |

[54] HYPEREUTECTIC GRAY IRON BRAKE MEMBER COMPOSITION
6 Claims, 1 Drawing Fig.

[52] U.S. Cl.................................................. 188/251,
75/123, 148/35, 188/218
[51] Int. Cl......................................................... F16d 69/02
[50] Field of Search.......................................... 75/123,
130; 148/35; 188/251M

[56] References Cited
UNITED STATES PATENTS

| 1,871,544 | 8/1932 | McCarroll | 148/35X |
| --- | --- | --- | --- |
| 2,747,713 | 5/1956 | Light | 188/251X |
| 2,761,801 | 9/1956 | Armstrong | 148/31 |
| 2,970,902 | 2/1961 | Alexander | 75/130X |
| 3,055,753 | 9/1962 | Matuschkovitz | 75/130X |
| 3,120,882 | 2/1964 | Maloney | 188/218 |
| 3,133,813 | 5/1964 | Ruff | 75/130X |
| 3,210,183 | 10/1965 | Ototani | 75/130 |
| 3,253,907 | 5/1966 | Schwindt | 75/123 |
| 3,278,299 | 10/1966 | Kessler | 75/130 |
| 1,973,263 | 9/1934 | Mitchell | 75/130X |
| 2,841,489 | 7/1958 | Morrogh | 75/130X |
| 3,299,482 | 1/1967 | Tache | 75/130X |

Primary Examiner—L. Dewayne Rutledge
Assistant Examiner—Joseph E. Legru
Attorneys—Peter P. Kozak, George A. Grove and William S. Pettigrew ABSTRACT: In a preferred form of the invention a disc brake rotor is disclosed which is formed of a hypereutectic gray iron composition having a relatively high capacity for damping mechanical vibrations, excellent wear resistance and high thermal conductivity. The composition is a pearlitic gray iron having a carbon equivalent of at least 4.5. Carbon is present in combined form in pearlite and as ASTM Type-A flake graphite.

3,559,775
PATENTED FEB 2 1971
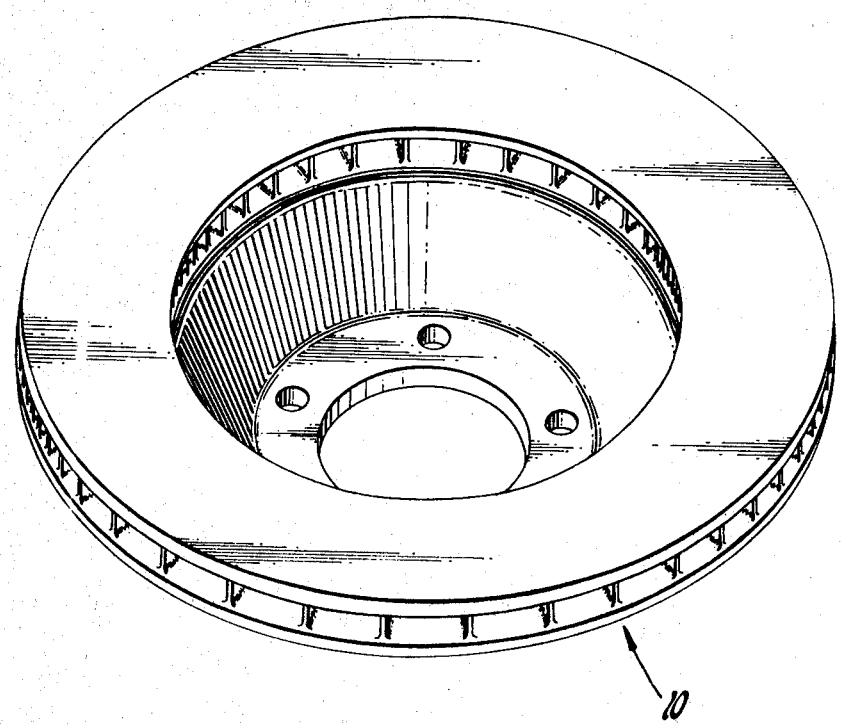
INVENTOR.
Edwin J. Miller
BY
George A. Grove
ATTORNEY

HYPEREUTECTIC GRAY IRON BRAKE MEMBER COMPOSITION

The subject invention relates to gray iron brake compositions and more particularly it relates to certain pearlitic gray iron compositions of high carbon and silicon content from which excellent disc brake rotors and like brake members may be formed.

Automobile brakes have long been, and continue to be, the subject of a great amount of engineering effort. The purpose of this work, of course, is to produce efficient, durable and safe brakes at a reasonable cost to the consumer. It has been the experience of those working in the automotive brake art that hypoeutectic gray iron (those iron-carbon-silicon compositions having a carbon content or carbon equivalent less than about 4.3 percent by weight) is an extremely useful material for the forming of brake drums, disc brake rotors and the like. The class of gray irons containing carbon and silicon in the range of about 3.1—3.5 percent by weight and 1.8—2.5 percent by weight respectively have demonstrated suitable hardness and thermal conductivity values to provide efficient wear resistant brake members. However, it has now been found that certain disc brake structures, having rotor members of hypoeutectic gray iron, are prone to squeal, especially at near zero speeds during braking and at high speeds under light brake line pressure. While the brakes are others otherwise suitable, the periodic squeaking noise is irritating to the driver and passengers of the vehicle.

To some extent noise can be reduced by attaching suitable inserts to the rotor, the principal vibrating member of the brake system, to dampen the vibration. However, it is apparent that this solution is not particularly desirable since it involves adding otherwise superfluous weight to the brakes just to reduce noise level. A more desirable solution would be to provide a material from which the disc brake rotor could be formed having the desirable properties now found in hypoeutectic gray iron plus the capacity to internally dampen vibrations induced in the rotating member by operation of the brake.

Accordingly, it is an object of the present invention to provide an improved brake member cast from a hypereutectic gray iron composition having a microstructure characterized by ASTM Type-A graphite dispersed in a matrix of pearlite, whereby the brake is both wear resistant and capable of internally damping mechanical vibrations that might produce irritating noises.

It is a further object of the present invention to provide a pearlitic gray iron composition containing, by weight, at least 3.6 percent carbon and at least 2.5 percent silicon such that the carbon equivalent is greater than 4.5 percent. This composition may be readily cast and machined into a highly effective, long lived brake member having a relatively great internal capacity to dampen mechanically induced vibrations.

In accordance with a preferred embodiment of the invention, these and other objects are accomplished by casting a disc brake rotor or the like from a hypereutectic pearlitic gray iron composition containing 3.6—4 percent carbon, 2.5—4 percent silicon, up to about 2 percent of one or more suitable pearlite stabilizing elements, and iron. It is expected that there will also be trace amounts of common impurities such as sulfur and phosphorus included in the composition. The concentrations of carbon and silicon are adjusted respectively so that the carbon equivalent content of the alloy is at least 4.5 percent by weight. In hypereutectic gray iron compositions which are suitable for the present invention, the carbon equivalent is determine determined by adding the total carbon content and one-third of the silicon content respectively by weight. Conventionally, a portion of the phosphorus content is included in determining carbon equivalent. However, the phosphorus content of the subject compositions is frequently substantially negligible. Moreover, phosphorus is not believed to play a significant role in my invention. The foundry practice employed in the preparation and casting of the subject composition is controlled such that a gray iron is produced having a substantially pearlitic matrix in which is dispersed relatively large and discrete bodies of graphite. The preferred form of graphite is that which is characterized as Type-A graphite by the American Society for Testing and Materials. It is also preferred that the pearlitic matrix contain less than about 10 percent—15 percent by volume-free ferrite as estimated from an examination of a photomicrograph of a representative portion of the structure. These hypereutectic gray iron compositions have excellent vibration damping capacities for use as brake members. Moreover, they surprisingly have the necessary wear resistant properties for employment as automobile brake members. It previously was believed that high carbon-high silicon gray irons would be too soft for employment as brake members. However, this is not the case and, as will be shown, there are in fact many unexpected advantages of employing the subject hypereutectic gray irons.

These and other objects and advantages will become more apparent from a detailed description of the invention in which reference will be made to the drawing which is a perspective view of a brake disc rotor.

A few specific examples will serve to further illustrate the practice and benefits of the invention.

A number of disc brake rotors were cast from a melt of hypereutectic gray iron composition comprising by weight about 3.74 percent carbon, 2.77 percent silicon, 0.64 percent manganese, 0.23 percent chromium, 0.46 percent phosphorus, 0.01 percent sulfur and the balance substantially all iron. It is noted that the carbon equivalent of this composition (total carbon plus one-third of silicon concentration) is 4.66 percent. An examination of the microstructure of a representative portion of one of the discs indicated that the matrix was made up of an estimated 10—15 percent by volume-free ferrite and the balance coarse pearlite. Dispersed throughout the substantially pearlitic matrix were relatively large discrete bodies of Type-A graphite, size 2—4. The disc brake rotors were the same structural design as are currently employed on one of the models of the automobiles manufactured by the assignee of this invention. A typical rotor is depicted at 10 in the attached drawing. The cast discs were machined, mounted on hubs and balanced exactly as are the current commercial disc rotors which are formed of lower carbon equivalent gray iron materials. Brake systems including the cast discs were mounted on automobiles and fully evaluated during extended cross country road tests. Throughout these tests the discs and disc brake systems were found to operate quietly and effectively.

In addition, the discs were subjected to laboratory testing to further assess the damping properties of the above gray iron composition. It is well known that additional vibration damping in a structure will reduce the amplitude of a vibration induced therein, and/or increase the rate of vibration decay when the vibratory source is removed. In the case of automobile disc brake rotors damping by the material itself is relatively low and, therefore, for purposes of evaluation analytical methods generally applied to viscous damped systems may be employed. An equation of motion for a freely vibrating, single-degree-of-freedom system is:

$$x = Ae^{-(C/C_c)\omega_0 t} \cos(\omega_1 t + \phi) \quad (1)$$

where $x$ is the instantaneous displacement, $(C/C_c)$ is the damping capacity of the structure expressed as a ratio of damping coefficient to the critical damping coefficient, $\omega_0$ is an undamped natural frequency not very different from the damped natural frequency $\omega_1$, and $A$ and $\Phi$ are the amplitude and phase contents respectively. It is, of course, recognized that a critically damped system (wherein $C = C_c$) will not vibrate in the usual oscillation sense. In this instance the displacement energy is completely converted to heat during the return of the system of its equilibrium position. Based upon the same assumptions inherent in equation (1), the ratio of two successive maximum amplitudes is:

$$\frac{A_1}{A_0} = e^{-2\pi(C/C_c)} \quad (2)$$

Hub mounted disc brake rotors prepared as described above were excited at 1,000—14,000 cycles per second by means of an electromagnet. This frequency range was selected as being typical of the vibrations encountered in normal driving conditions. A 0.5 mg. accelerometer had been bonded with an epoxy resin to the outer edge of the inboard cheek of the rotor to sense the amplitude of vibrations. The accelerometer output was amplified and fed to an oscilloscope and the damping capacity of the brake disc was computed from the scope tracings using equation (2) above. A relatively narrow range of camping capacities was found over the frequency range of the induced vibrations. The range was sufficiently narrow that the mean of the damping capacities over the range was taken to be representative of the damping capacity of the disc. The average of the mean damping capacities for all of the discs tested was found to be 0.36 percent of the critical damping capacity of the structure. As noted above, disc rotors of this gray iron composition were all found to be exceptionally quiet in actual automobile operation over prolonged road testing. Therefore, the above damping capacity was taken to be representative of an acceptable objective value for this property of the material. Further testing of the brakes of this gray iron composition also demonstrated that they display excellent wear resistance and are in other respects suitable for use in automotive brake systems.

A second set of disc brake rotors was cast from a gray iron composition comprising by weight 3.72 percent carbon, 2.50 percent silicon, 0.61 percent manganese, 0.23 percent chromium, 0.44 percent phosphorus, 0.01 percent sulfur and the balance substantially iron. The carbon equivalent of this material is noted to be 4.55 percent. From an examination of the microstructure of one of the discs it was estimated that the matrix contained 5—10 percent by volume-free ferrite, the balance being coarse pearlite. Dispersed throughout the matrix were relatively large discrete bodies of ASTM Type-A graphite. As was described with reference to the above-prepared discs, the subject castings were a machined, mounted on hubs, balanced, mounted on automobiles and subjected to road testing. The disc brake systems including the subject gray iron rotor members were found to be quiet throughout all types of driving and road conditions. The rotors were also subjected to vibration damping tests as described above in which they were caused to vibrate at frequencies over a range of 1,000—14,000 cycles per second. The average of the mean damping capacities for all the discs were found to be 0.28 percent of the critical damping capacity. Since all the discs were found to be satisfactory from the standpoint of quiet operation, the above value is considered a measure of this desirable characteristic of the composition.

A third lot of disc brake rotors were cast, this time from a gray iron composition comprising by weight, 3.95 percent carbon, 2.71 percent silicon, 0.55 percent manganese, 0.29 percent chromium, 0.08 percent phosphorus, 0.1 percent sulfur and balance iron. It is noted that the carbon equivalent of this composition is 4.85 percent by weight. A portion of one of the discs was examined microscopically. The matrix contained an estimated 5 percent by volume-free ferrite and the balance pearlite. Dispersed throughout the matrix were relatively large discrete bodies of ASTM Type-A graphite. The discs were machine, mounted on hubs, balanced, mounted on automobiles and road tested as above. These brake systems were also found to operate quietly in a variety of road and driving conditions. The discs were subjected to laboratory vibration testing as above and the average of the mean damping capacities was found to be 0.25 percent of the critical damping capacity of the structure.

For purposes of comparison a number of current model disc brakes of conventional hypoeutectic gray iron compositions were both road tested and laboratory tested as described. In each group of discs it was noted that a relatively wide range of noise making or damping capacities could be observed. Some of the discs were quiet in actual operation, but many produced an irritating squeaking noise under normal driving conditions. When these discs were subjected to laboratory vibration testing it was found that their damping capacities varied from about 0.079 percent up to about 0.20 percent of the critical damping capacity of the structure.

It is, of course, appreciated that there will be variations in damping capacity with the frequency of vibration and with the specific structure of a particular disc brake rotor. It is also appreciated that the analytical procedure employed herein to calculate the damping capacities of the disc brake rotors may not completely reflect all of the vibration characteristics of the structure. However, it is apparent that the subject high carbon equivalent gray iron compositions were superior, particularly with respect to damping capacity, both in the laboratory and in actual road tests. Therefore, damping capacities (as calculated from equation 2) of about 0.2—0.25 percent of the critical damping capacities are considered to be the low limit, at least with respect to vibration frequencies of 1,000—14,000 Hz., for quiet brake operation.

In general, it is preferred that the subject hypereutectic gray iron compositions contain, by weight, 3.6—4.0 percent carbon, 2.5—4.0 percent silicon, a small but effective amount of a suitable pearlite stabilizer such that about 5 percent but no more than about 10—15 percent by volume-free ferrite is present in the matrix of the composition, and the balance iron (with the exception of small amounts of normal impurities such as phosphorus and sulfur). The relative amounts of carbon and silicon may be adjusted within the above-stated ranges so long as the carbon equivalent of the composition is at least about 4.5 percent by weight. In addition, the foundry practice of preparing and casting the compositions is controlled in accordance with well-known gray iron practice whereby the matrix of the solidified cast iron is substantially all pearlitic, preferably containing no more than about 10—15 percent by volume-free ferrite. Graphite (uncombined carbon) is dispersed throughout the matrix preferably in the form of relatively large discrete bodies, characterized as Type-A graphite by ASTM.

In the above examples manganese and chromium were employed as pearlite stabilizers to maintain the amount of free ferrite below about 15 percent by volume. It will be appreciated that other pearlite stabilizers such as copper, tin and molybdenum, alone or in combination, may be employed in amounts up to 1 or 2 percent by weight to stabilize the pearlite. A substantially pearlitic matrix is considered to be necessary to produce suitable hardness and wear resistant properties for brake members. Examples of suitable hypereutectic gray iron compositions containing other combinations of pearlite stabilizers include:

Example IV

| | All percentages by weight |
|---|---|
| Carbon | 3.6—4.0 |
| Silicon | 2.50—2.80 |
| Manganese | 0.55—0.85 |
| Chromium | 0.10—0.20 |
| Tin | 0.05—0.10 | and the balance iron except for trace impurities such as sulfur, phosphorus and the like.

Example V

| | All percentages by weight |
|---|---|
| Carbon | 3.60—4.0 |
| Silicon | 2.50—2.80 |
| Manganese | 0.55—0.85 |
| Chromium | 0.10—0.20 |
| Copper | 0.15—0.25 | and the balance iron except for trace impurities.

Example VI

| | All percentages by weight |
|---|---|
| Carbon | 3.60–4.0 |
| Silicon | 2.50–4.0 |
| Chromium | 0.10–0.30 |
| Molybdenum | 0.10–0.20 | and the balance iron except for trace impurities.

As noted above, it is preferred that chemically uncombined carbon be present as relatively large discrete bodies of graphite as exemplified by ASTM Type-A graphite. When the graphite is in this form the compositions display the superior strength, hardness, and thermal conductive conductivity properties which are necessary to obtain good wear resistance in a brake member. It is also preferred that the matrix be substantially pearlitic to obtain wear resistance. However, it is believed that some free ferrite contributes to the damping of vibrations by magnetomechanical mechanisms. A relatively small amount of ferrite, up to 10—15 percent by volume, appears to improve the vibration damping characteristics of the composition without adversely affecting the wear properties of the material.

In the prior art, hypereutectic gray iron compositions have not been considered particularly suitable for brake member applications because of their lower hardness and tensile strength values. The decreased strength of these compositions is, of course, due in large measure to the greater quantity of graphite which is distributed throughout the pearlitic matrix. However, I have found that the additional graphite contributes substantially to the thermal conductivity of the composition. In actual brake member applications it appears that the high thermal conductivity of my composition contributes to higher braking capacity and resistance to heat checking. I have found that hypereutectic gray iron compositions having a tensile strength of at least 24,000 p.s.i. and a Brinell hardness of at least 145 are entirely suitable for disc brake rotor applications. Wear resistance is apparently governed by matrix microstructure.

In view of the improved thermal conductivity of my high carbon gray iron composition, it is believed that conventional brake drums could be cast from this material without the use of fins which heretofore have been necessary in many drum designs for adequate cooling purposes.

While my invention has been described in terms of a few specific embodiments thereof, it will be appreciated that other forms might readily be adapted by those skilled in the art and therefore the scope of my invention is to be considered limited only by the following claims.

I claim:

1. A gray iron composition having a matrix of predominantly coarse pearlite with ASTM Type-A graphite dispersed therein, said composition comprising, by weight, 3.6 to 4.0 percent carbon, 2.5 to 4.0 percent silicon, iron, and a small but effective amount of a pearlite stabilizer such that a small amount up to about 15 percent by volume-free ferrite is present in said matrix, the sum of the carbon content and one-third of the silicon content being at least 4.5 percent by weight.

2. A gray iron composition having a predominantly coarse pearlitic matrix with ASTM Type-A graphite dispersed therein, said composition comprising 3.6 to 4.0 percent carbon, 2.5 to 4.0 percent silicon, 0.5 to 1.0 percent manganese, 0.1 to 0.4 percent chromium, 0 to 0.05 percent tin, 0 to 0.20 percent copper and balance iron, the sum of the carbon content and one-third of the silicon content being at least 4.5 percent by weight, said matrix containing about 5 to 15 percent by volume-free ferrite dispersed in said pearlite.

3. A cast gray iron brake member having a matrix of predominantly coarse pearlite with ASTM Type-A graphite dispersed therein, said composition comprising, by weight, 3.6 to 4.0 percent carbon, 2.5 to 4.0 percent silicon, iron, and a small but effective amount of a pearlite stabilizer such that a small amount up to about 15 percent by volume-free ferrite is present in said matrix, the sum of the carbon content and one-third of the silicon content being at least 4.5 percent by weight.

4. A cast gray iron disc brake rotor having a predominantly coarse pearlitic matrix with ASTM Type-A graphite dispersed therein, said composition comprising, 3.6 to 4.0 percent carbon, 2.5 to 4.0 percent silicon, 0.5 to 1.0 percent manganese, 0.1 to 0.4 percent chromium, 0 to 0.05 percent tin, 0 to 0.20 percent copper and the balance iron, the sum of the carbon content and one-third of the silicon content being at least 4.5 percent by weight, said matrix containing about 5 to 15 percent by volume-free ferrite dispersed in said pearlite.

5. A gray cast iron disc brake rotor having a predominantly coarse pearlitic matrix with ASTM Type-A graphite dispersed therein, said composition comprising 3.6 to 4.0 percent carbon, 2.5 to 2.8 percent silicon, 0.5 to 1.0 percent manganese, 0.1 to 0.4 percent chromium, 0 to 0.05 percent tin, 0 to 0.20 percent copper, and balance iron, the sum of the carbon content and one-third of the silicon content being at least 4.5 percent by weight, said matrix containing a small amount up to about 15 percent by volume-free ferrite, said cast disc having a damping capacity of at least 0.20 percent of the critical damping capacity of said disc when said disc is caused to vibrate at a frequency in the range of 1,000 to 14,000 Hz..

6. A gray cast iron disc brake rotor relatively free from squeal, said rotor having a central hub for attachment to a motor vehicle wheel, a web connector portion at the outer edge of said hub and an annular rotor section having opposing friction braking surfaces at the outer edge of said web portion to receive brake pads, said disc brake rotor being formed entirely of gray cast iron comprising by weight 3.6—4.0 percent carbon, 2.5—2.8 percent silicon, 0.5—1.0 percent manganese, 0.1—0.4 percent chromium, up to 0.05 percent tin, up to 0.20 percent copper, and the balance substantially all iron, the sum of the carbon content and one-third of the silicon content being at least 4.5 percent by weight, said gray cast iron having a matrix of predominantly coarse pearlite with ASTM Type-A graphite dispersed therein together with a small amount up to about 15 percent by volume-free ferrite, said disc brake rotor having a damping capacity of at least about 0.20 percent of the critical damping capacity of said disc brake rotor when said disc brake rotor is caused to vibrate at a frequency in the range of 1,000 to 14,000 Hz.

UNITED STATES PATENT OFFICE
CERTIFICATE OF CORRECTION

Patent No. 3,559,775      Dated February 2, 1971

Inventor(s) Edwin J. Miller

It is certified that error appears in the above-identified patent and that said Letters Patent are hereby corrected as shown below:

Column 1, line 27, after "are" cancel "others"; line 67, before "determined" cancel "determine". Column 3, line 16, "camping" should read -- damping --; line 42, after "were" cancel "a"; line 50, "were" should read -- was --. Column 4, 1 20, "0.2-0.25" should read -- 0.20-0.25 --. Column 5, line 18, after "thermal" cancel "conductive". Column 6, line 39, after "least" insert -- about --.

Signed and sealed this 3rd day of August 1971.

(SEAL)
Attest:

EDWARD M. FLETCHER, JR.       WILLIAM E. SCHUYLER, JR.
Attesting Officer      Commissioner of Patents